United States Patent [19]

Cale et al.

[11] Patent Number: 4,615,138
[45] Date of Patent: Oct. 7, 1986

[54] BEE SMOKER

[75] Inventors: David Cale; Rodney Little, both of Hamilton, Ill.

[73] Assignee: Dadant & Sons, Inc., Hamilton, Ill.

[21] Appl. No.: 672,358

[22] Filed: Nov. 16, 1984

[51] Int. Cl.⁴ ............................................. A01K 55/00
[52] U.S. Cl. .................................................... 43/128
[58] Field of Search .......................... 6/7, 12 R, 12 M; 43/127, 128; 239/288.5

[56] References Cited

U.S. PATENT DOCUMENTS 943,792  12/1909  Russell ................................. 43/127
1,386,283  8/1921  Shrader ................................. 43/128

FOREIGN PATENT DOCUMENTS 4387  12/1932  Australia ............................... 43/127

Primary Examiner—Robert P. Swiatek
Attorney, Agent, or Firm—Fred Philpitt

[57] ABSTRACT

This invention pertains to a bee smoker device that includes an enveloping wire network that decreases the chances that a beekeeper or hives or surrounding equipment will be hurt or damaged by the hot housing of the bee smoker.

4 Claims, 3 Drawing Figures

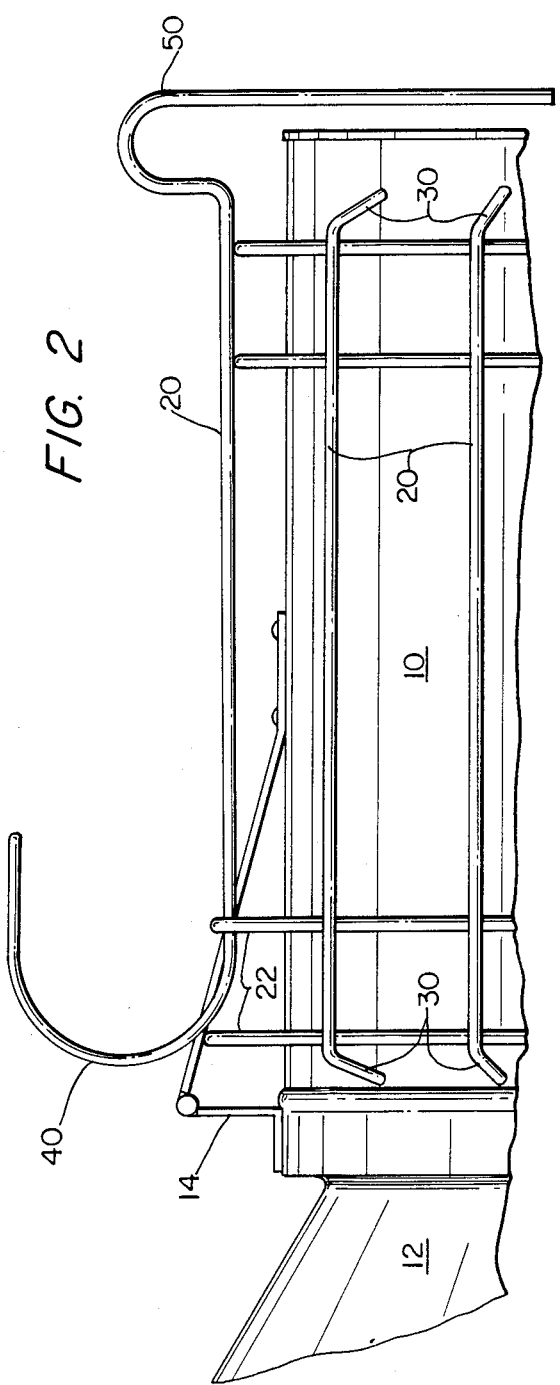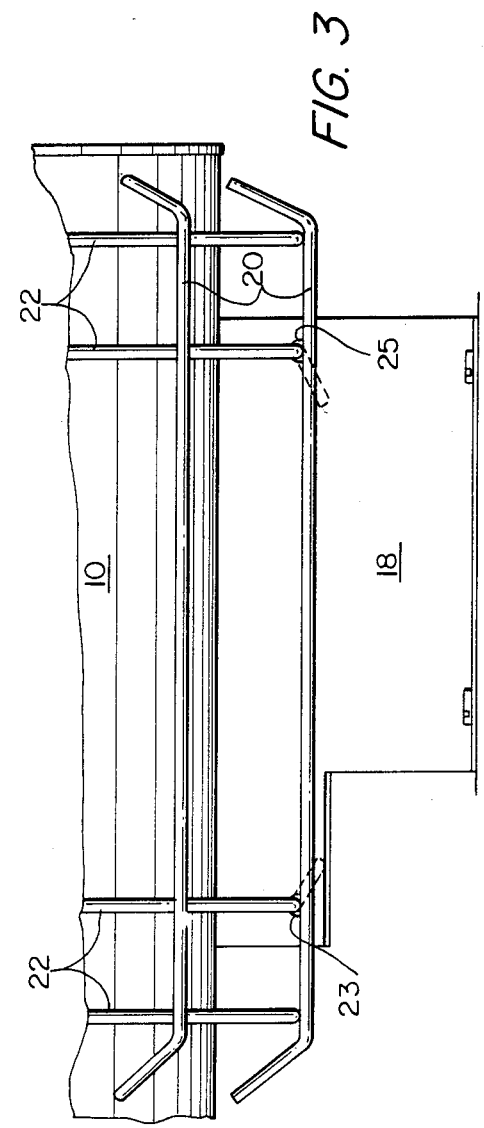

4,615,138

BEE SMOKER

SUMMARY OF THE INVENTION

Considered from one aspect, the present invention includes:
(a) a generally cylindrical housing which is adapted to contain smoke generating materials,
(b) an outlet opening from said housing for the dispensing of smoke,
(c) bellows means which is adapted to force air into said housing and facilitate the generation of smoke,
(d) attachment means for operatively connecting said bellows means to said cylindrical housing,
(e) a wire network surrounding at least 50% of the exterior surface of said cylindrical housing, said wire network including:
  (1) a plurality of laterally spaced apart elongated wires that are disposed outwardly from said cylindrical housing and aparallel to the longitudinal axis of said cylindrical housing, and
  (2) a plurality of spaced apart arcuate wires interconnecting said spaced apart elongated wires at substantial right angles thereto, and
(f) hook means connected to said wire network so that the combination of the hook means and wire network will permit hanging of the bee smoker on supports so that said hot cylindrical housing will be spaced away from said support.

The invention will be better understood by reference to the drawings wherein:

FIG. 2 is an enlarged fragmentary side view of the embodiment shown in FIG. 1; and FIG. 3 is another enlarged fragmentary side view of the embodiment of FIG. 1.

DETAILED DESCRIPTION

Figure 1:
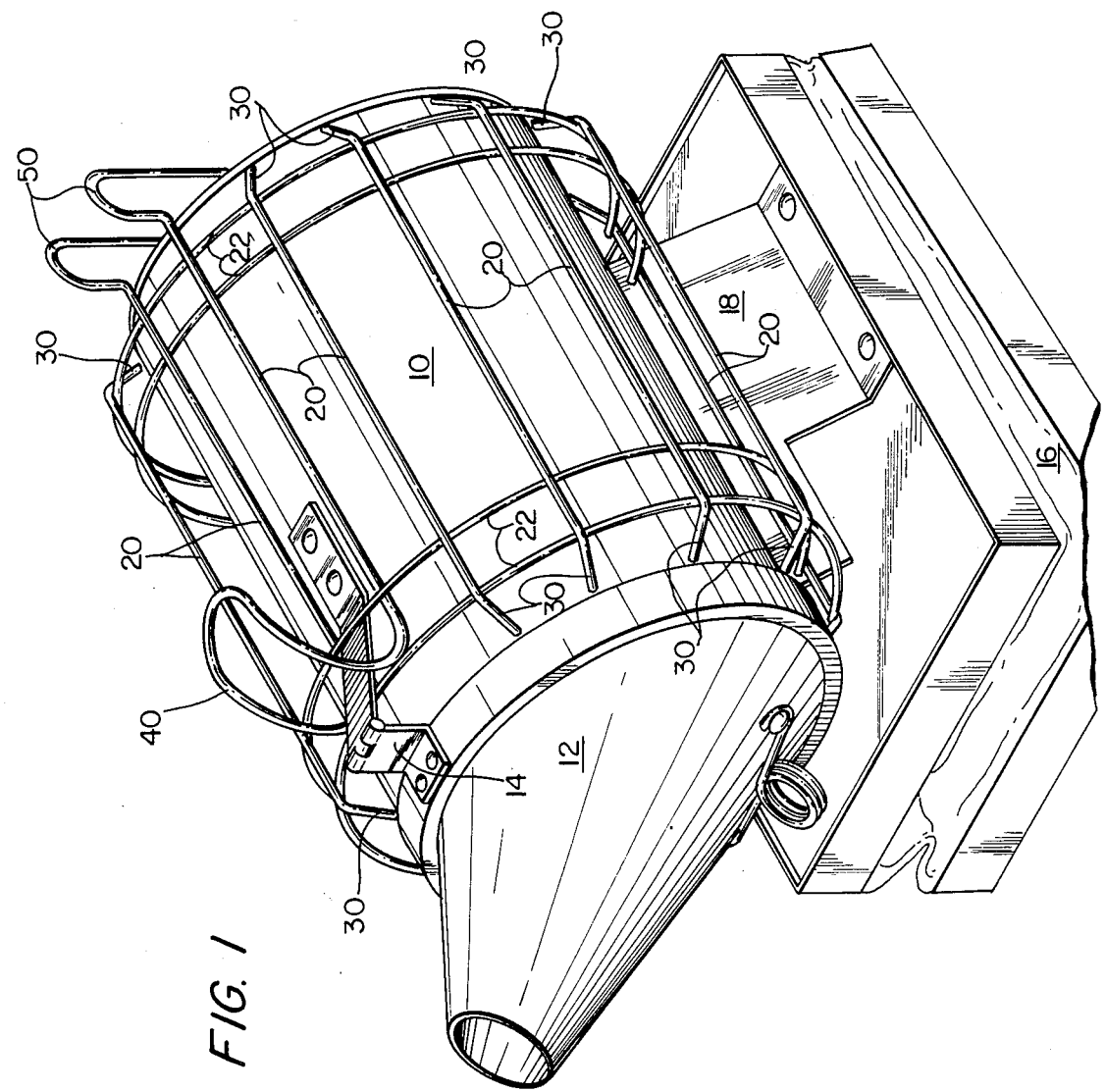
FIG. 1 is a perspective view illustrating one embodiment of the invention.

Referring now to the drawings, the cylindrical housing 10 is adapted to contain smoke generating materials such as charcoal, combustible briquettes, wood chips, etc. One end of the cylindrical housing 10 is provided with an outlet opening 12 through which the generated smoke is dispensed. The outlet opening 12 may be attached to the cylindrical housing 10 by a simple hinge means 14 so that when the outlet opening 12 is pivoted away from the cylindrical housing 10, the interior of the cylindrical housing can be loaded with smoke generating materials.

When the smoke is generated in cylindrical housing 10 by the combustion of material that is placed in the housing a simple air bellows 16 forces air into the cylindrical housing 10 through a suitable opening or passageway (not shown). The bellows 16 is connected to the cylindrical housing 10 by any suitable attachment means 18 so that the housing 10 and the bellows 16 constitute an integral unit.

The foregoing combination of components 10, 12, 14, 16 and 18 has been in commercial use for some number of years. However, since combustion can generate a good deal of heat in addition to smoke,the hot sides of the cylindrical housing 10 have often been a hazard to both beekeepers and items in the vicinity of the smoking operation. These hazards are decreased or eliminated by employing the wire network of this invention.

The wire network includes a plurality of elongated wires 20 that are disposed outwardly from the exterior of the cylindrical housing 10. These elongated wires 20 are parallel to the longitudinal axis of the cylindrical housing 10. The wire network preferably extends around more than 50% of the exterior of cylindrical housing 10, although if one desired to produce a smoker that provided less protection, the network might be limited to only 25% of the exterior surface of the housing.

A plurality of spaced apart arcuate wires 22 interconnect the elongated wires 20 at substantially right angles, thus maintaining both the lateral spacing between adjacent elongated wires and the spacing of these wires from the housing. As few as two such arcuate wires could be used or more than the four shown. As shown in FIGS. 1 and 3, these arcuate wires 22 may be used to anchor the entire wire network to the attachment means 18 (i.e. at 23 and 25) between the housing 10 and the bellows 18.

The drawings show that angled end members 30 may be provided as extensions of elongated wires 20 to bridge the end space between the housing 10 and the wire network.

The drawings show that the bee smoker includes hook means connected to the wire network so that the combination of the hook means and the wire network will permit hanging the bee smoker on a support so that said hot cylindrical housing will be spaced away from said support. The hook means preferably comprises a U-shaped wire bent into a U-shape as shown at 40 and can be joined to the ends of two elongated wires 20 (see FIG. 1).

The drawings also show that the smoker can include a bottom support bracket 50 in the form of bent loops. The bend in 50 in conjunction with the hook 40 functions to keep the hot housing 10 spaced away from a hive. It also allows the smoker to be supported on the side of a hive. The portion of 50 that is parallel to the right end of the housing 10 (see FIG. 2) can function as a bottom support means for the smoker and protects against accidental burning of the hive.

What is claimed is:
1. A bee smoker device comprising in combination
(a) a generally cylindrical metal housing which is adapted to contain smoke generating materials,
(b) a funnel-like outlet opening at the top end of said housing for the dispensing of smoke,
(c) bellows means which is adapted to force air into said housing and facilitate the generation of smoke,
(d) attachment means for operatively connecting said bellows means adjacent to said cylindricl housing,
(e) a wire network surrounding at least 50% of the exterior surface of said cylindrical housing, said wire network including
  (1) a plurality of laterally spaced apart elongated wires that are disposed outwardly from said cylindrical housing and parallel to the longitudinal axis of said cylindrical housing, and
  (2) a plurality of spaced apart arcuate wires interconnecting said spaced apart elongated wires at substantial right angles thereto,
(f) hook means connected to said wire network so that the combination of the hook means and wire network will permit hanging of the bee smoker on a support so that said hot cylindrical housing will always be maintained at a spaced distance away from said support, with the longitudinal axis of the said cylindrical housing being disposed in an essentially vertical direction, and (g) a bent loop member located outwardly from said wire network adjacent the bottom end of said cylindrical housing which is opposite to said outlet end that is adapted to dispense smoke, said bent loop member extending laterally outwardly from the outer circumference of said wire network, whereby when said smoker is supported on the side of a hive by said hook means, said bent loop member will space the cylindrical housing far enough away from a hive to insure against burning of the hive by said cylindrical housing.

2. A smoker device according to claim 1 wherein said bent hook member extends parallel to the bottom end of said cylindrical housing and at a spaced distance therefrom and also serves as a bottom supporting member for the smoker device so that the hot bottom end of said cylindrical housing will be prevented from bearing against a surface that it might burn.

3. A bee smoker according to claim 1 wherein said hook member is generally U-shaped.

4. A bee smoker according to claim 1 wherein said bent loop member is generally U-shaped in overall configuration.

* * * * *